(12) United States Patent
Washio et al.

(10) Patent No.: US 6,446,105 B1
(45) Date of Patent: Sep. 3, 2002

(54) METHOD AND MEDIUM FOR OPERATING A VECTOR COMPUTER

(75) Inventors: Takumi Washio, Sankt Augustin (DE); Yoshiyuki Kubo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/335,705

(22) Filed: Jun. 18, 1999

(30) Foreign Application Priority Data

Jun. 18, 1998 (DE) .......................... 198 27 238

(51) Int. Cl.[7] .............................. G06F 7/32; G06F 7/38
(52) U.S. Cl. ........................................ 708/520; 708/443
(58) Field of Search ................................. 708/443, 520

(56) References Cited

U.S. PATENT DOCUMENTS

| | | | | |
|---|---|---|---|---|
| 5,200,915 A | * | 4/1993 | Hayami et al. | ............. 708/520 |
| 5,267,185 A | * | 11/1993 | Akabane et al. | ............. 708/520 |
| 5,446,908 A | * | 8/1995 | Kevorkian | .................. 708/520 |
| 5,680,338 A | * | 10/1997 | Agarwal et al. | ............. 708/520 |

OTHER PUBLICATIONS

Washio et al.; "Overlapped Multicolor Milu Preconditioning"; J. Sci. Computer; vol. 16, No. 3; May 1995; pp. 636–650.

* cited by examiner

Primary Examiner—Tan V. Mai
(74) Attorney, Agent, or Firm—Foley & Lardner

(57) ABSTRACT

Method is provided for calculating a matrix by using a vector computer with at least one vector processor and a plurality of memory banks. The method controls procedure of the calculation so that the memory banks may be accessed in a constant stride. Furthermore, the method can be applied to vector computers having various queue length and the number of the memory banks. As a result, rapid operation can be made compared to the existing method. In addition, without further outlay, other dependencies than the known 5-point stencil or 7-point stencil can be taken into account.

6 Claims, 17 Drawing Sheets

FIG.3

$$[\phantom{XXX}][\phantom{XXX}][\phantom{XXX}]\begin{bmatrix} q_1 \\ \vdots \\ q_m \end{bmatrix} = \begin{bmatrix} r_1 \\ \vdots \\ r_m \end{bmatrix}$$

$(\Delta-L) \quad \Delta^{-1} \quad (\Delta-U) \quad q \quad = \quad r$

FIG.4

```
for l = 1, ..., nl
    for i ∈ H(l)
```

$$P_i = (1/\Delta_{i,i})(r_i + \sum_{j<i}(L_{i,j}P_j))$$

```
    end of loop for i
end of loop for l
for l = nl, ..., 1
    for i ∈ H(l)
```

$$q_i = P_i + (1/\Delta_{i,i})\sum_{j>i}(U_{i,j}q_j)$$

```
    end of loop for i
end of loop for l
```

FIG.7

(Forward substitution)

$p_i := 0$ for all $i$ for $id = 1, \ldots, nd$; with $nd$  2
    for $l = 1, \ldots,$ istr,
        for $i = 1, 1 + $ istr$, 1 + 2$ istr$, \ldots, m$
            $t_i = 0$
        end of loop for $i$
        for $k = 1, \ldots,$ nzr
            for $i = 1, 1 + $ istr$, 1 + 2$ istr$, \ldots, m$
                $t_i := t_i + L_{i,\ i-izr\_k}\ p_{i-izr\_k}$
            end of loop for $i$
        end of loop for $k$
        for $i = 1, 1 + $ istr$, 1 + 2$ istr$, \ldots, m$
            $p_i = (1/\triangle_{i,i})\ (r_i + t_i)$
        end of loop for $i$
    end of loop for $l$
end of loop for $id$ (Reverse substitution)

$q_i := 0$ for all $i$ for $id = 1, \ldots, nd$; with $nd$  2
    for $l = $ istr$, \ldots, 1,$
        for $i = 1, 1 + $ istr$, 1 + 2$ istr$, \ldots, m$
            $t_i := 0$
        end of loop for $i$
        for $k = 1, \ldots,$ nzr
            for $i = 1, 1 + $ istr$, 1 + 2$ istr$, \ldots, m$
                $t_i := t_i + U_{i,\ i+izr\_k}\ q_{i+izr\_k}$
            end of loop for $i$
        end of loop for $k$
        for $i = 1, 1 + $ istr$, 1 + 2$ istr$, \ldots, m$
            $q_i = p_i + (1/\triangle_{i,i})\ t_i$
        end of loop for $i$
    end of loop for $l$
end of loop for $id$

FIG.10

```
n := 2
Mflopsmax = 0
start of loop via n
        set back internal clock
            for i = 1 to n x_i = x_i + p_i z_i end of loop for i Mflops = n/time if Mflops > Mflopsmax
            Mflopmax := Mflops
        otherwise
            lvc := n
        end of enquiry n = n + 1
end of loop for n
```

FIG.12

```
istrmax := int(m/lvc)
x := 0
istr := 0
for i = 2, 3, ..., istrmax
        if gcd(i,nb) = 1, then
            modmin := i
            modmax := 0
            for k = 1, ..., nzr
                modmin := min(modmin, mod(izr_k, i))

modmax := max(modmax, mod(izr_k, i))

end of loop for k if modmin ≠ 0, then
                xtest int(i/modmax)
                if xtest > x, then
                    x := xtest
                    istr := i
                end of xtest enquiry
            end of gcd(i, nb) enquiry
        end of modmin enquiry
end of loop for i
```

FIG.15

```
for i = int((ip-1)m/np) + 1, ..., int((ip-m)/np)
        pᵢ := 0
end of loop for i
SYNCHRONISATION
(Forward substitution)
for id = 1, nd
        for ia = 0, 1
                for l = int((2(ip-1) + ia)istr/(2 np)+1,
                    ..., int((2(ip-1) + ia + 1)istr/(2 np))
                        for i = 1, 1 + istr, 2 + 2istr, ..., m
                                tᵢ := 0
                        end of loop for i
                        for k = 1, ..., nzr
                            for i = 1, 1 + istr, 1 + 2istr, ...,m
                                tᵢ := tᵢ + L_{i, i-izr_k} p_{i-izr_k}
                            end of loop for i
                        end of loop for k
                        for i = 1, 1 + istr, 1 + 2 istr, ..., m
                                pᵢ = (1/△_{i,i}) (rᵢ + tᵢ)
                        end of loop for i
                end of loop for l
                SYNCHRONISATION
        end of loop for ia
end of loop for id
```

FIG.16

```
(Reverse substitution)
for i = int((ip-1)m/np) + 1, ..., int((ip-m)/np)

q_i := 0 end of loop for i
SYNCHRONISATION
for id = 1, ..., nd
      for ia = 1, 0
            for l = int((2(ip-1) + ia + 1)istr/(2np)) + 1,
                ..., int((2(ip-1) + ia)istr/(2np))
                  for i = 1, 1 + istr, 1 + 2istr, ... , m t_i := 0 end of loop for i
                  for k = 1, ..., nzr
                        for i = 1, 1 + istr, 1 + 2 istr, ...,m t_i := t_i + U_{i,i+izr_k} q_{i+izr_k} end of loop for i
                  end of loop for k
                  for i = 1, 1 + istr, 1 + 2 istr, ..., m q_i = pi + (1/△_{i,i}) t_i end of loop for i
            end of loop for l
            SYNCHRONISATION
      end of loop for ia
end of loop for id
```

19-Point-Stencil

27-Point-Stencil

METHOD AND MEDIUM FOR OPERATING A VECTOR COMPUTER

BACKGROUND OF THE INVENTION

1. Field of the Invention

The invention relates to a method of operating a vector computer in order to solve an equation including matrix.

2. Description of the Related Art

In the past, the following differential equations (1) to (3) are known in solution of boundary value problems.

In particular, in the case of elliptical partial differential equations, these equations are often used.

$$A\ q = r \quad (1)$$

$$(\Delta - L)p = r \quad (2)$$

$$\Delta^{-1}(\Delta - U) - L)q = p \quad (3)$$

Where, A is an m×m matrix, $\Delta$ is an m×m diagonal matrix, L is a lower m×m matrix, and U is an upper m×m matrix, and where p, q and r are respectively vectors of the dimension m.

These boundary value problems arise in a plurality of numerical calculations of technical magnitudes, such as in the calculation of temperature distribution in a three-dimensional body, or calculation of a fluid flow about a given geometric shape. A further simple example is the solution of the Poisson equation with Dirichlet boundary conditions.

Normally, for the numerical solution of the problems, discrete variable method is used, the space in which the solution is to be calculated is covered by a point lattice, and in which then a solution for each lattice point is calculated numerically.

For this purpose, the solution function about each lattice point may be developed into a Taylor series, and then the differential quotients can be replaced by difference quotients. In order to calculate an approximate solution at a lattice point, knowledge of the approximate solution at the adjacent lattice points is sufficient if the remainders of the series development are negligible. Such a method is disclosed for example in "Numerische Mathematik für Ingenieure und Physiker" W. Tornig, Volume 2, Springer-Verlag, Berlin.

For example it may be sufficient in a two-dimensional space with a square grid to know the solution at the directly adjacent four lattice points, in order to calculate the approximate solution at the lattice point surrounded by these four lattice points.

FIG. 1 shows a so-called 5-point stencil being used in relation to this case. While in FIG. 2, a 7-point stencil is shown as the corresponding case for three-dimensional space.

By applying the approach described above, with appropriate numbering of the lattice points, to the shown 7-point stencil, the problems may be represented as follows:

$$a_{ijk,1}q_{ijk-1} + a_{ijk,2}q_{ij-1k} + a_{ijk,3}q_{i-1jk} + a_{ijk,4}q_{ijk} + a_{ijk,5}q_{i+1jk} + a_{ijk,6}q_{ij+1k} + a_{ijk,7}q_{iljk+1} = r_{ijk} \quad (4)$$

For each lattice point (ijk) from the set G with $$G = \{(ijk) 1 \leq i \leq n_x, 1 \leq j \leq n_y, 1 \leq k \leq n_z\} \quad (5)$$

Where, $n_x$, $n_y$, and $n_z$ are the number of lattice points in x, y, and z axis directions, respectively.

With appropriate selection of the numbering of the lattice points, the matrix A usually contains only a few extra-diagonal elements which are different from zero.

Equation (1) shown above is then not directly solved, but firstly, using relation of equation (6) and preconditioner (7), is converted into the equation (8).

$$A = D - L - U \quad (6)$$

$$M = P_1 \times P_2 \quad (7)$$

$$(P_1^{-1} A\ P_2^{-1})(P_2 q) = P_1^{-1} r \quad (8)$$

Where, D is the diagonal matrix from the elements of the diagonals of the original matrix A.

A frequently used and successful preconditioner is so-called "incomplete lower upper preconditioner" (ILU preconditioner).

Also, the following equation holds.

$$M = (\Delta - L')\Delta^{-1}(\Delta - U') \quad (9)$$

Thus, $\Delta$=D−diagonal elements $(L\Delta^{-1}U)$−α line total (extra-diagonal elements $(L\Delta^{-1}U)$) with 0<=α<=1; extra-diagonal elements (F)=F−diagonal elements (F); and the line total means a diagonal matrix in which each element of the diagonals corresponds to the sum of the elements of the same line.

This is the known Gustavson acceleration (I. Gustafson) "A Class of First Order Fracturization Methods", BIT 18 (1978), pages 142–156). The matrices U' and L' are identified in equation (9) with an apostrophe, in order to indicate that they are not necessarily identical to the matrices U and L from equation (6), although this is the case in the ILU approach described. Appropriate alternations to the matrix U' and L' can lead to improved convergence.

In order to determine $\Delta$ in equation (9), there are further approaches, roughly the SSOR approach with $\Delta$=D. Preconditioning corresponds to the solution of the following linear equation (10).

$$M\ q = r \quad (10)$$

Where, r is the known vector. A schematic view of this equation is shown in FIG. 3. The solution can be obtained by solving the equations (11) and (12).

$$(\Delta - L)p = r \quad (11)$$

$$\Delta^{-1}(\Delta - U)q = p \quad (12)$$

If the initial problem was aligned on a structured grid, the elements which are different from zero of the matrices U and L can be arranged regularly. For example, in the case of the 7 point stencil in the regular three-dimensional grid points each of which is included in the above set G and has a lexicographic number of the grid points in the matrix L, elements which are different from zero are present only in the first secondary diagonal, in the $n_x$-th secondary diagonal and in the $(n_x\ n_y)$ th secondary diagonal. In other words, only the elements at $L_{i,i-1}$, $L_{i,i-nx}$ and $L_{i,i-nx\ ny}$ are different from zero.

Here, the n-th secondary diagonal means a sequence which includes elements aligned parallel to a sequence of primary diagonal elements $(L_{1,1}, L_{2,2}, \ldots)$ and is the n-th sequence from the primary diagonal elements.

The equations (11) and (12) can be solved by corresponding forward or reverse substitutions.

$$p = \Delta^{-1}(r - L\ p) \quad (13)$$

$$q = p - \Delta^{-1} U\ q \quad (14)$$

An example of pseudo code of an algorithm (1) for these substitutions is shown in FIG. 4.

This method is known as the hyperplane method. It can be shown that hyperplanes can be constructed from lattice points and the lattice points can be calculated independently of one another. This is because that the solution at any optional lattice point of the hyperplane is not dependent on the solution of any other point on the same plane.

Corresponding hyperplanes for three-dimensional space are shown in FIG. 5. The following equation may be applied to the 7-point stencil.

$$H(l)=\{i=i_x+(i_y-1)n_x+(i_z-1)n_xn_y|i_x+i_y+i_z=l+2\}(1<=l<=nl=n_x+n_y+n_z-2) \quad (15)$$

The disadvantage of this method resides mainly in the fact that the efficiency of a queue processing or a vector processing in a vector processor is greatly reduced by the indirect addressing in the above described algorithm (1).

It would be more advantageous to be able to access the memory always with a constant stride (see also "Computer Architecture.", Computational Science Education Project, Section 3.3.1 "Interleaved Memory").

Moreover the method is not suitable for computers with divided parallel memory blocks and a plurality of vector processors, as no parallelism occurs relative to magnitude of the hyperplane, and as many hyperplanes H(l) alone are too small to be logically distributed between a plurality of processors. Furthermore, in the known hyperplane method, no generalization to higher-dimensional spaces or stencils other than the known 5-point or 7-point stencils is known. An approach in order to counter these problems is not to solve the equations (11) and (12) exactly, but to calculate an approximate solution by iteration. Normally, a von-Neumann series development is used for this.

$$p=(\Delta-L)^{-1}r=\Delta^{-1}(I-L\Delta^{-1})^{-1}r=\Delta^{-1}r+\Delta^{-1}L\Delta^{-1}r+(\Delta^{-1}L)^2\Delta^{-1}r+(\Delta^{-1}L)^3\Delta^{-1}r+\ldots+(\Delta^{-1}L)^{nr}\Delta^{-1}r \quad (16)$$

This method is in fact fully capable of vector processing, and can be processed in parallel, as matrix-vector-products are always only calculated. However, in order to obtain an approximate solution, the result of the method is not precise as good as those of the hyperplane method. Also, the von-Neumann series must be calculated up to the members of the third or fourth order. Therefore, the computational outlay is three or four times as great, as a result, the advantage of vectorization and parallelization is removed.

Another approach in order to convert the hyperplane method in a suitable way for vector computers, was disclosed by Takumi Washio and Ken Hayami in "Overlapped Multicolor MILU Preconditioning", J. SCHI Computer, Volume 16, No. 5 on pages 636–651 in May 1995.

In accordance with this approach, for the case of three dimensional space and the 7-point stencil, firstly the hyperplanes are so divided that a number istr of subsets are generated. This is represented as following equation (17).

$$C(l)=\{(i,j,r)\in G| \bmod(i+j+k-3, istr) +1=l\} \quad (17)$$

In other words, the subset C(l) is a unification of the hyperplanes H(l), H(l+istr), H(l+2istr) . . .

Then, each of the subsets, which are also called "colors", is calculated in the sequence C(1), C(2), . . . C(istr), C(1), C(2), . . . C(istr) for the forward substitution, and in the sequence C(istr), C(istr-1), . . . C(1), C(istr), C(istr-1) . . . C(1) for the reverse substitution. This is shown by way of example shown in FIG. 6. Unknown start values are respectively set to zero. In this method, each color subset is calculated at least twice, so that the dependence of H(max (l-istr, 1) on H(l) is taken into account.

An example of pseudo code executing an algorithm (2), which performs this method, is shown in FIG. 7.

Also, a flowchart corresponding to this algorithm is shown in FIG. 8.

By appropriate selection of istr, a situation can be achieved in which each color subset contains so many lattice points that a vector processing is logically possible. For the known 7-point stencil, additional lattice points can be so arranged that for each element from C(l), the memory can be accessed with a constant stride, and thus indirect addressing can be avoided. For example, when $n_x=n_y$ and with optional $n_z$, istr=$n_x$-1 can be selected. In this case, all memory accesses for calculating the lattice points within C(l) can be executed with a constant stride istr, and on the other hand, $(n_x n_y n_z)$/istr is sufficiently large as a vector length.

For example, when a 7-point stencil with a lattice points which in the x-axis direction has $n_x$=10, in the y-axis direction $n_y$=11, and in the z-axis direction $n_z$=10, and with istr=9 determined as above, after a division into color subsets is undertaken, the calculation is done as shown in FIG. 6. It is thus clear that the six further lattice points required for calculating a lattice point i, that is i+1, i+10, i+110, i-1, i-10, i-110, which do not belong to the same color subset. Therefore, calculation of a lattice point of a color subset is independent of the calculations of the other lattice points of the same color subset. Indirect addressing is likewise not necessary, since when further lattice points are required, they are immediately visible from knowledge of i. Also, high speed processing on a vector processor is possible, as the corresponding memory areas in which the data of the lattice points i+1, i+10, i+110, i-1, i-10 and i-110 are stored can be preloaded.

A further improvement to this multi-color technique, which is likewise disclosed in the above-named article, is the so-called "Overlapping Multicolor" technique. Here the convergence of the multi-color technique is improved in that for the forward substitution of the color subsets are executed in the sequence C(istr-w), (C(istr-w-1) . . . C(istr), C(1), C(2) . . . C(istr). The overlapping, i.e. the number of color subsets which are additionally calculated, comes to w. A corresponding system may also apply to reverse substitution. This overlapping multi-color technique shows an improved convergence compared to the single multi-color technique, but offers the same advantages as regards vector length and memory access.

SUMMARY OF THE INVENTION

A difficulty in the multi-color technique and in the multi-color technique with overlapping is determining the number of color subsets and applying to cases other than the known 7-point stencil or 5-point stencil. Too small a number of color subsets leads to an increased computing outlay, since the start value for the first approximation is too remote from the solution. Too large a number of color subsets leads to a lower computing speed, since the vector lengths for the queue structure of the vector computer become too short.

Determination of the magnitude of the istr in stencils other than the above 5-point and 7-point stencils is not so simple, since a condition remains that the individual lattice points of a color subset must be independent of one another.

The object of the invention is to provide an improved method of solving the above equation (1) on a vector computer with a given queue length.

The method according to the invention is suitable particularly in solving partial elliptic differential equations for a regular square lattice.

An advantage of the invention is that the method is specially adapted to the actualities of a vector computer, such as the queue length and the number of memory banks, so that it operates more rapidly than the known methods.

A further advantage of the method according to the invention is that, without further outlay, other dependencies than the known 5-point stencil or 7-point stencil can be taken into account.

A yet further advantage of the method according to the invention is that it can be well processed in parallel, i.e. can be processed in parallel on a plurality of processors, in particular, in a computer system with distributed memory.

The object, advantages and special aspects of the invention are explained with reference to the description of a special embodiment.

BRIEF DESCRIPTION OF THE DRAWINGS

FIG. 3 schematically shows a matrix M for the 7-point stencil;

FIG. 4 shows a n example of pseudo code of an algorithm (1) for solving a linear equation;

FIG. 7 shows an example of pseudo code of an algorithm (2);

FIG. 10 shows an example of pseudo code of an algorithm (3) for determining a vector length;

FIG. 12 shows an example of pseudo code of a desired algorithm (4) for calculating the istr;

FIGS. 15 and 16 shows an example of pseudo code of an algorithm (5);

DESCRIPTION OF THE PREFERRED EMBODIMENT

In order to simplify understanding of the invention, firstly some principles of vector computers will be explained.

Known computers contain one or a plurality of processors, one or a plurality of memories, input/output devices and communication channels between these components.

In order to execute a command, the processor must load this command from a memory, decode it and execute it. The time required for such a cycle depends on the organization of the memory and of the communication channels as well as the complexity of the command and the internal structure of the processor.

Computer programs often pass through loops, which contain only one or a few simple commands. An example of such a loop is the calculation of a vector sum and/or of a vector cross-product.

It should be noted that when even simple multiplication of two numbers is executed in a binary-operating, a processor normally comprises a series of individual steps, e.g. in the simplest case the displacement of a bit sequence to the left by one bit (multiplication by 2) and the addition of binary numbers.

If such an algorithm is processed with a simple known scalar computer, the majority of the time is used up in repeatedly loading and decoding the same command, and storing intermediate results.

In order to solve this problem, vector computers are used.

Figure 9:
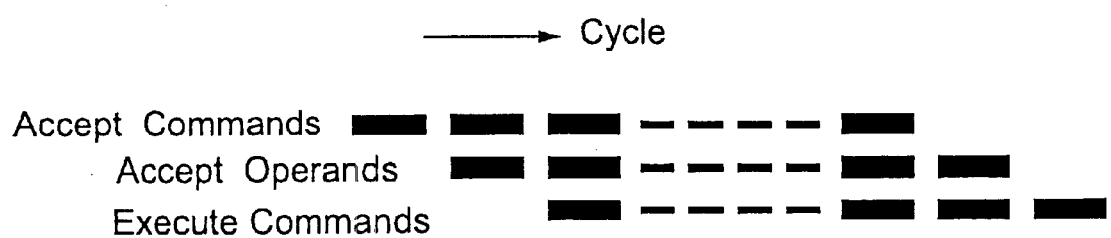
FIG. 9 shows a basic diagram explaining the operation of a vector computer.

The basic construction of an example of the operation in a vector computer is shown in FIG. 9.

In a first cycle in the example, a first command is fetched from a command memory. In the second cycle, this command is passed to that portion of the processor which prepares the operands, and a second command is fetched from the command memory. From the third until the m-th cycle, the second command is executed from the fourth to the (m+1)-th cycle. After the m-th cycles, the processor outputs the results of each cycle, so that for processing n commands in all m+n−1 cycles are required. On the other hand, a scalar computer would require (n m) cycles.

In other words, vector computers use queues, data/commands being transferred from a memory into a vector register via a loading queue. Calculation is then carried out in an arithmetical queue, and the result is passed back into the memory via memory queues. The arithmetical queue is a multi-functional queue, which can execute individual steps, such as calculation of a floating decimal point, in parallel.

The efficiency or calculating performance of such a vector computer, expressed in floating decimal point calculating operations per second (FLOPS), depends closely on the so-called vector length. It can be seen from FIG. 9 that in the case of the command stack to be executed by vector processing, the first command requires m cycles, while each further command adds only one additional cycle. This method of processing assumes that the n-th command can be executed without the necessity for knowing the result of one of the preceding m−1 commands, as is typically the case in the above-named vector combinations.

Therefore, vector length is understood to be a number representative of the number of commands which may be executed by vector processing. Conventionally, the suitable vector length for a given vector computer can be assessed by a simple loop. An algorithm (3) can serve to execute the loop, and an example of pseudo code of the algorithm (3) is shown in FIG. 10.

Figure 11:
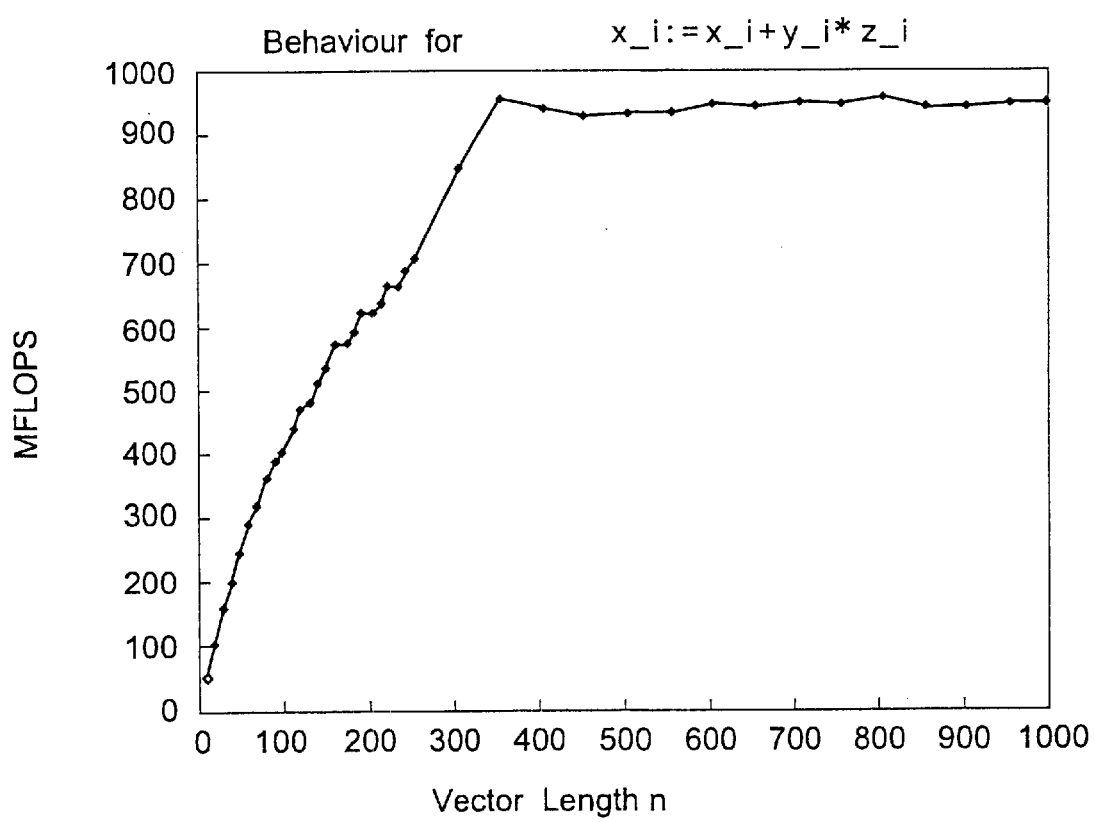
FIG. 11 shows a graph representing the relation between the computing performance and the vector length in a known vector computer.

FIG. 11 shows, with reference to the example of a NEC SX4 computer, the influence of vector length on the computer performance. If one firstly observes a clear increase in the computer performance with increasing vector length, then above about n=400 the vector length scarcely has any further influence on the computer performance.

In the present description, minimum vector length is understood to be that vector length from which the computer performance is almost independent of the vector length. In the example, this is about 400.

This minimum vector depends on the vector processor used in any case. Thus for example, the Fujitsu-VPX requires vectors with a minimum length of 1000, in order fully to be able to utilize the advantageous advantages of vector processing, while the Cray-EL98 manages with considerably shorter vector lengths.

The fact that the respective minimum vector length scarcely any influence of the vector length on the computer performance is to be observed, is ascribed to a series of reasons. In fact, with full overlapping in FIG. 9, i.e. when the number of steps in the queue is equal to the number of commands in a stack, only a small advantage can still be achieved with a further increase in vector length.

A further factor impairing the computer performance of a computer is the number, construction and organization of the memory. In order to access a storage location, an associated memory bank is usually pre-loaded, and only pre-loaded when the storage location is accessed. Then the memory bank is again down-shifted. The time for pre-loading and down-shifting can come to a multiple of the actual access time. Therefore it is conventional that the bits which are to be accessed in succession are stored in various memory banks, so that the next memory banks can always be pre-loaded in advance. In this way a considerable shortening of the overall memory access time required is achieved. However, this assumes that it is always known which memory banks are to be accessed in succession. In the above mentioned hyperplane method with indirect addressing, this shortening is impossible, since the addresses of the next accesses must always first be calculated. Therefore, applying to the indirect addressing should be avoided.

On the other hand, a method in which memory access with a known and constant stride is suitable for a vector computer. The method uses for example, a constant spacing, always already known, between storage locations called up one after the other.

Similar memory access problems also occur if direct addressing access is to be made in brief succession to the same memory bank. This also reduces the computer performance, since the memory bank must always be down-shifted and then again pre-loaded before a renewed access.

Therefore, loops to be processed by vector processing are preferably so designed that sufficient time passes between two accesses to a memory bank.

A further improvement in computer performance can be achieved if processing of the commands is distributed over a plurality of independent vector processors operating in parallel. A condition of this is that a plurality of independent part tasks can be formed.

As already described, the invention relates to the solution of the equation (1) using the multi-color technique on a vector computer.

In order to do justice to the previously described factors influencing computer performance, the invention proposes to determine a constant memory access stride istr according to the following rules a) to c).

a) mod $(izr_k, istr) \neq 0$ for all k=1 . . . nzr. Herein, $izr_k = \{j:L_{i,i-j} \neq 0$ or $U_{i,i+j} \neq 0;\}$ and nzr is the number of all j for which $L_{i,i-j} \neq 0$ or $U_{i,i+j} \neq 0$.

b) the greatest common divisor (gcd) of istr and nb is 1, whereby nb is the number of memory banks, and c) istr is as small as possible, so that the actual vector length is greater than that for the minimum vector length required for the vector processor.

Also, the actual value for istr gives a maximum for the magnitude x, and the following equation (18) is applied.

$$x = \min\{\text{int}(istr/\text{mod}(izr_k, istr)) \text{ with } k=1, \ldots nzr\} \quad (18)$$

Rule a) ensures that all calculating operations can be executed independently of one another within a color subset, so that vector processing becomes possible within a color subset.

This assumes that none of the numbers izrk is divisible by istr without remainder. By means of using this rule, it is possible not only to handle the 5-point stencil or the 7-point stencil, but any dependencies can be taken into account by the method according to the invention.

Rule b) ensures that no memory conflict occurs, i.e. that access to the same memory bank is not afforded in succession, and that all the memory banks are utilized.

Rule c) ensures that the vector length is large enough in order to use the vector computer optimally. In this respect it should be noted that with increasing vector length the convergence of the method is impaired. This is to be ascribed to the fact that at the beginning of both of the forward and of the reverse substitution, each of the factors $p_i$ or $q_i$ is set for all i to the value 0 (or another suitable start value). After the first passage through the loop via 1, each of the factors $p_i$, $p_i+istr$, $p_i+2istr$, . . . $q_m$ is set to a new value corresponding to first approximate value. Then, further calculations of the other factors $p_i$ or $q_i$ is executed. The convergence is the more effective the more rapid the first approximations available for further calculation.

In order to ensure good convergence, therefore, the equation (18) is provided. This equation (18) is connected with the above-mentioned von-Neumann series development, and ensures that the convergence of the method according to the invention is at least as good as a series development according to equation (16) as far as member ntr=(nd−1) x.

Figure 13:
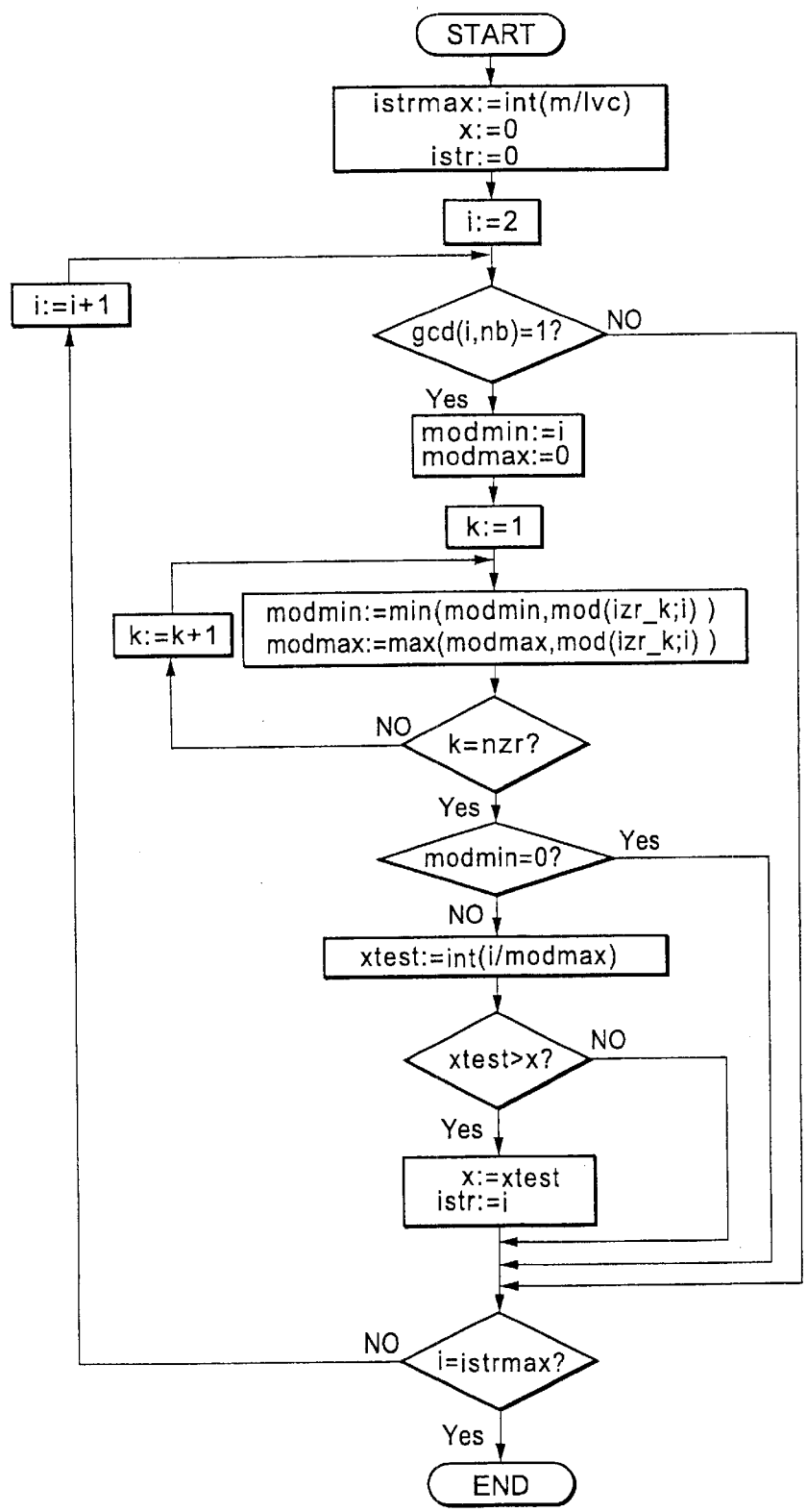
FIG. 13 shows a flowchart for further explanation of the algorithm (4)

An example of pseudo code of a preferred algorithm (4) for calculating istr is shown in FIG. 12. Also, a flowchart corresponding to this algorithm is shown in FIG. 13 for further explanation.

In this case, 1vc is the minimum vector length, i.e. the minimum vector length to be required for the vector processor, and gcd(i nb) is the greatest common divisor of i and nb.

Alternatively to this, in particular the rule c) and applying of the equation (18) can be taken account of in particular via a fuzzy conjunction, since the minimum vector length is not a sharp threshold. This can be taken account of in the above-named algorithm (4), the loop for example running via i not as far as istrmax, but to an optional multiple of istrmax, and solutions with i>istrmax being the less preferred in that i is >istrmax.

In the following, embodiment of the invention described above will be described in conjunction with a parallel vector computer with np=2 vector processors. It is clear to the person skilled in the art that more than two processors can be utilized in a similar way.

Figure 1:
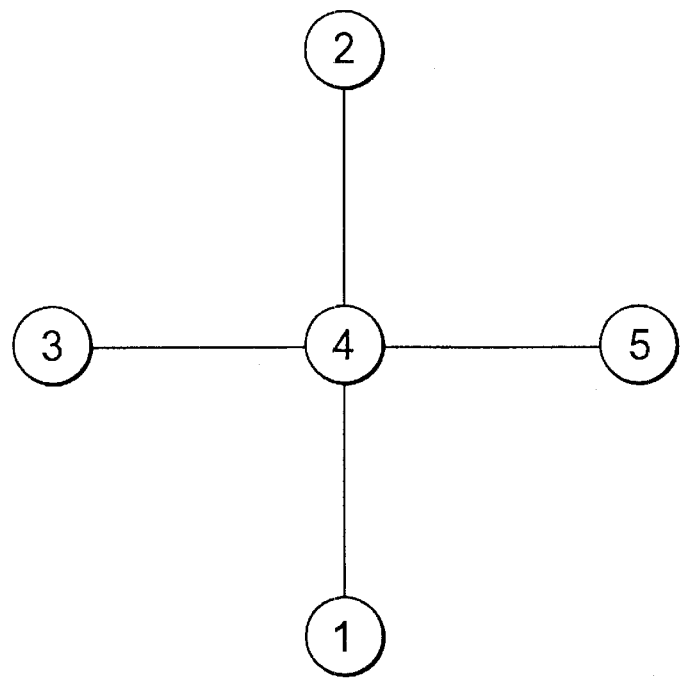
FIG. 1 shows a two-dimensional lattice with a 5-point stencil.
Figure 2:
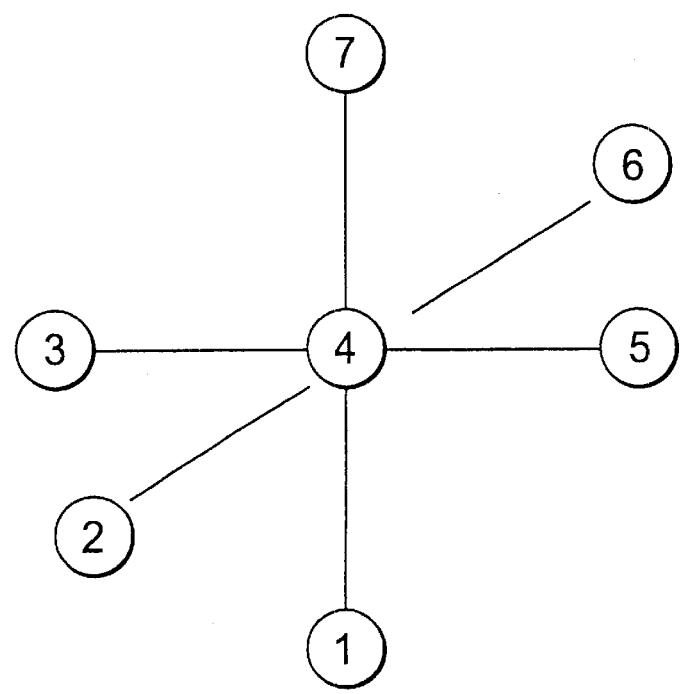
FIG. 2 shows a three-dimensional lattice with a 7-point stencil.
Figure 5:
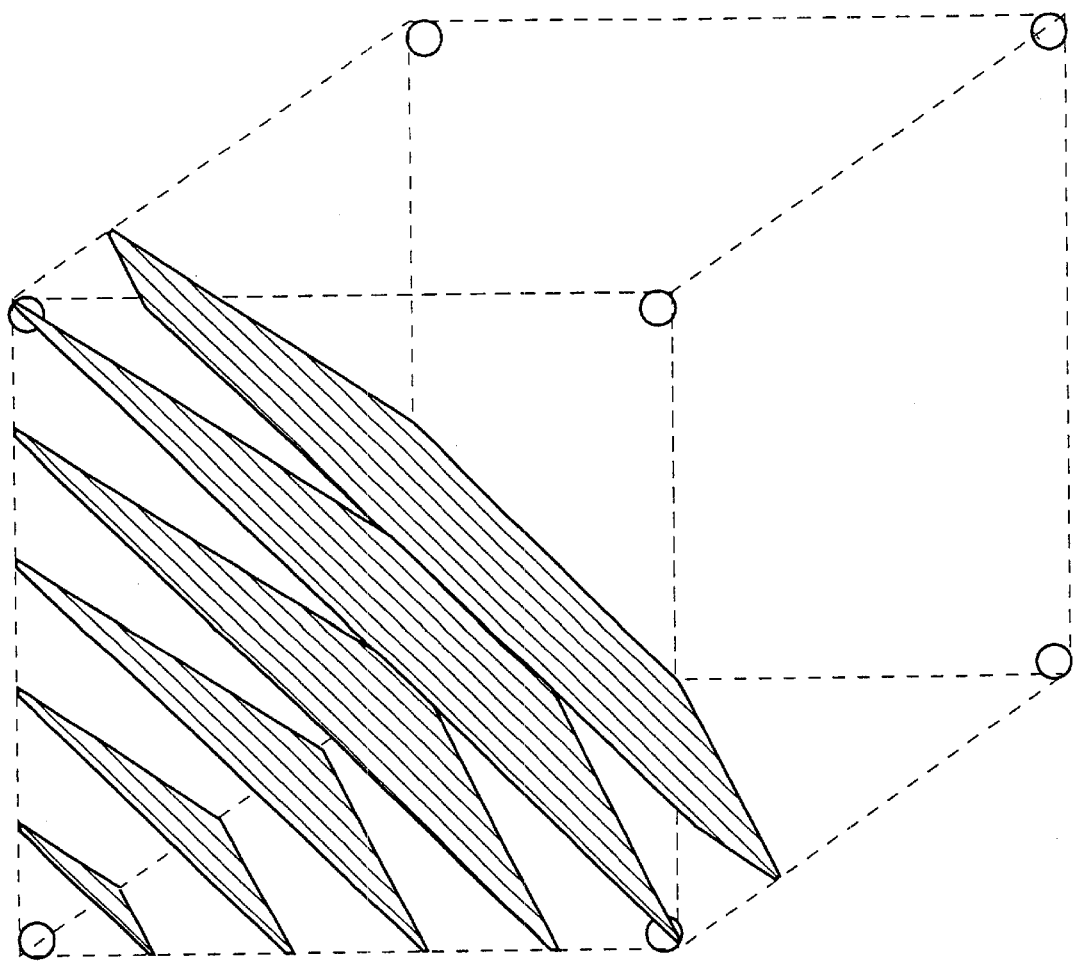
FIG. 5 schematically shows the position of the hyperplanes in three-dimensional space.
Figure 6:
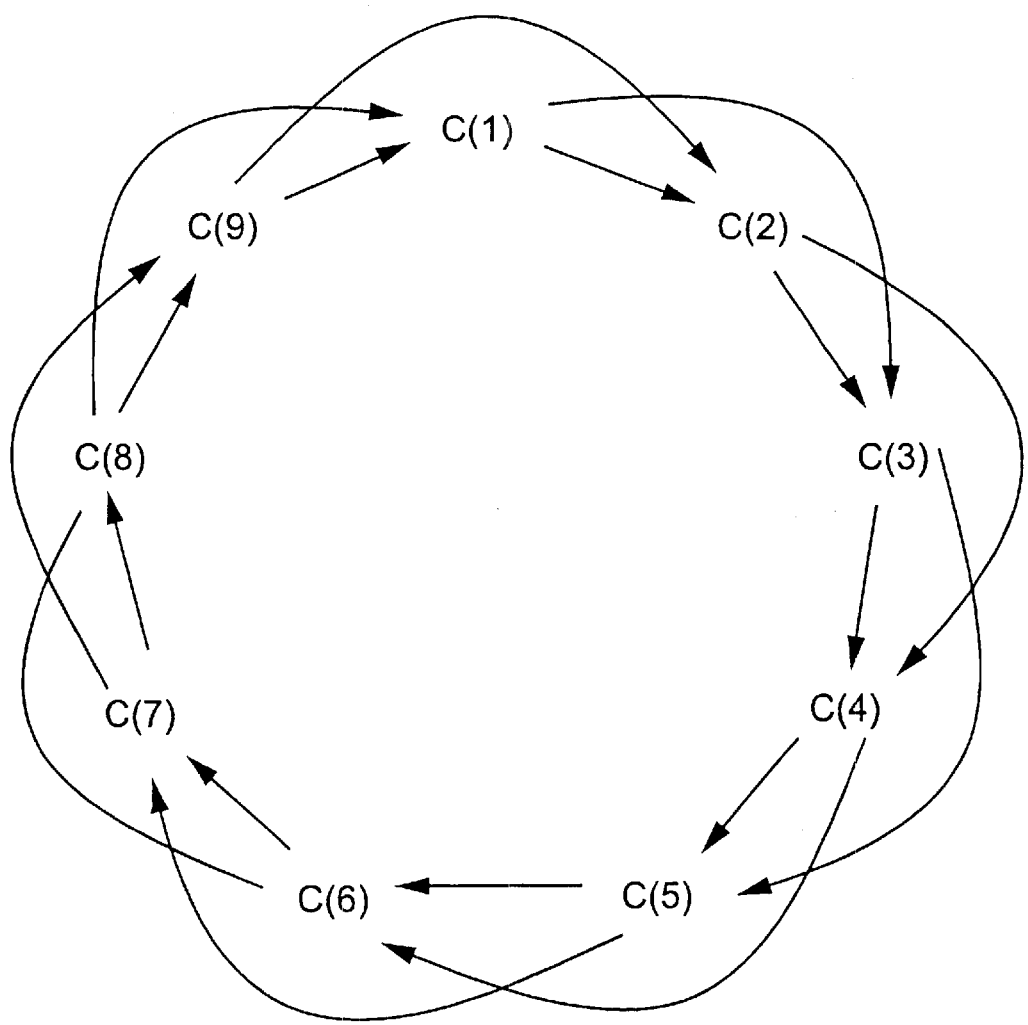
FIG. 6 schematically shows the sequence of calculation for the case $n_x=10$, $n_y=11$ and istr=9 with optional $n_z$.
Figure 8:
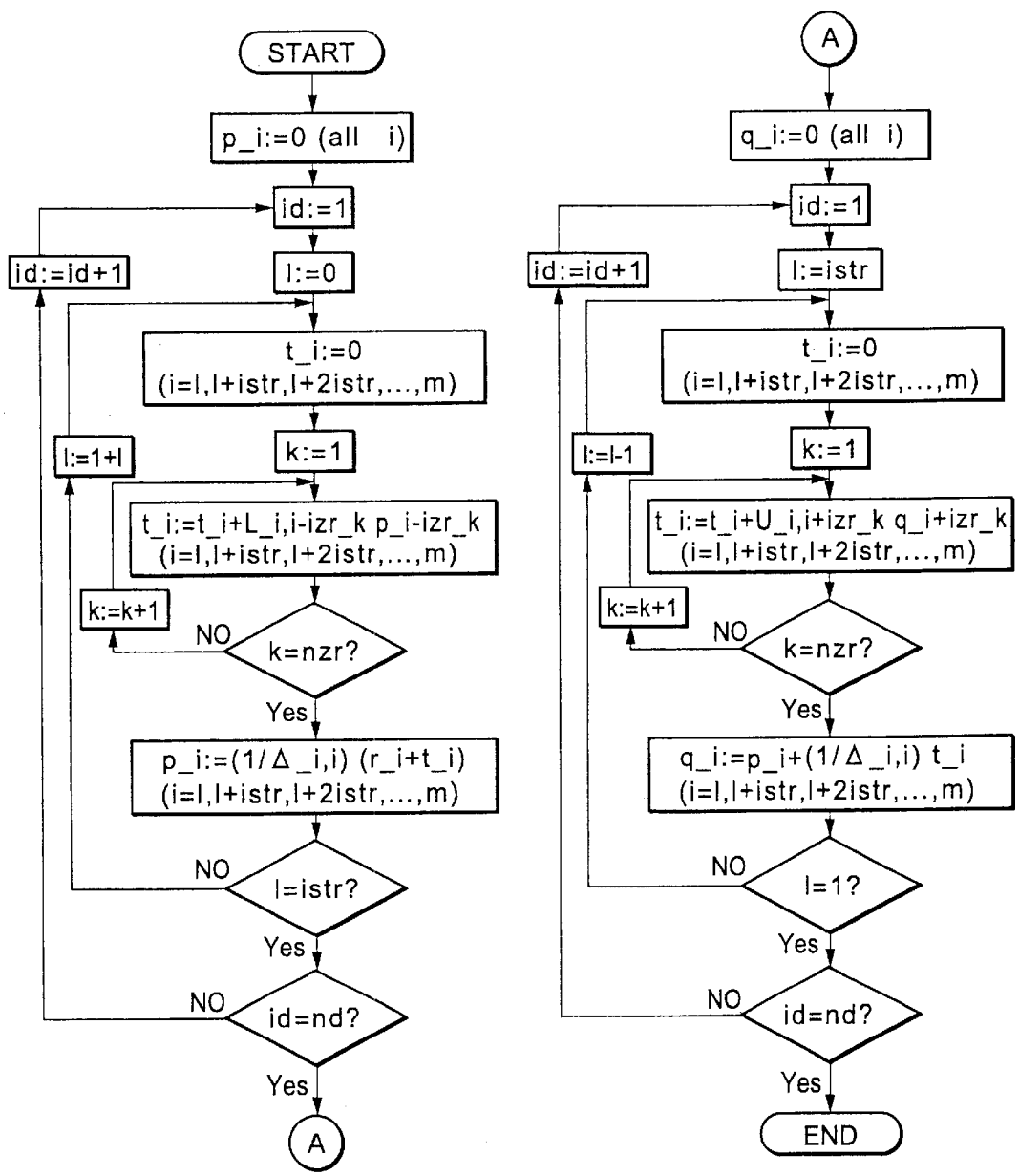
FIG. 8 shows a flowchart for further explanation of the algorithm (2)
Figure 14:
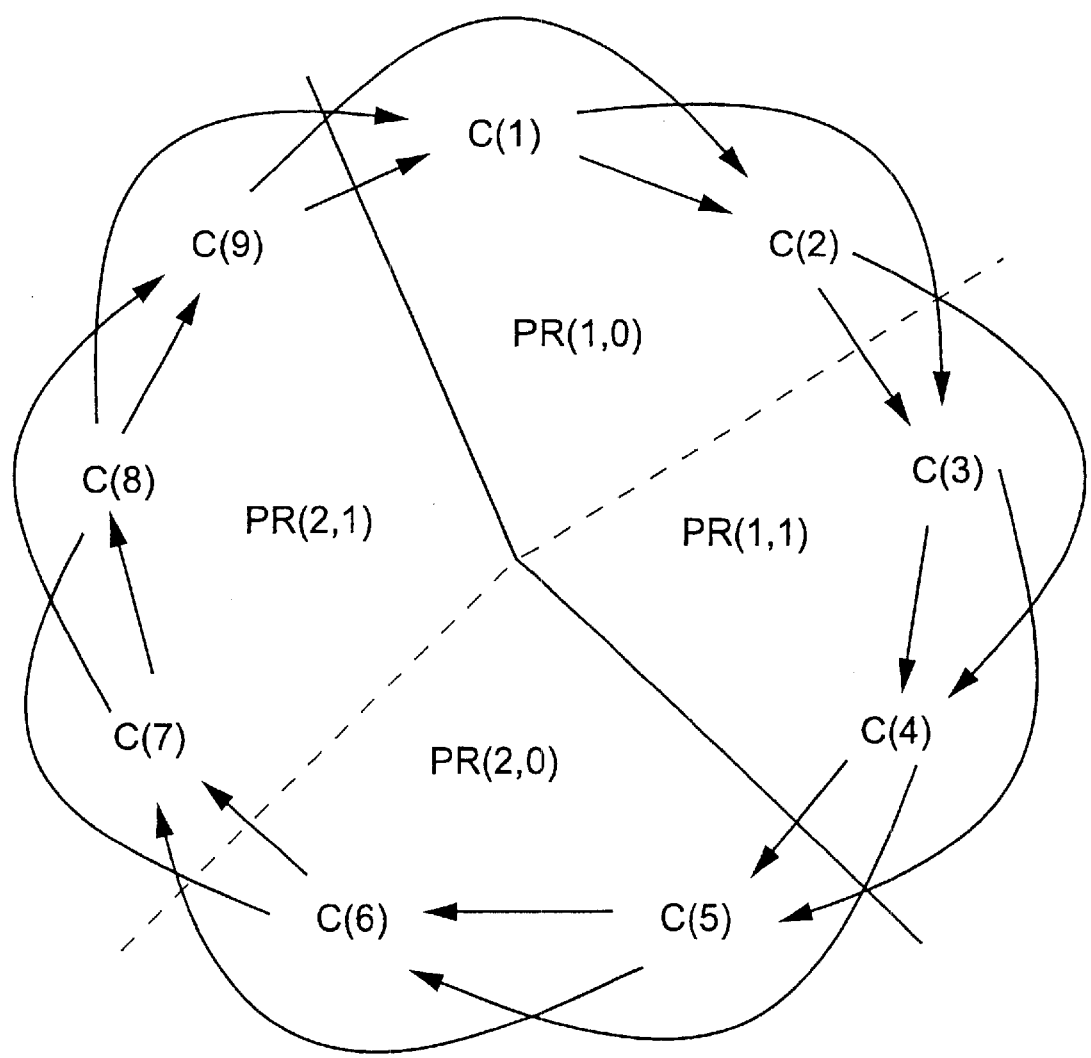
FIG. 14 schematically shows the sequence of the calculations for the case $n_x=10$, $n_y=11$ and istr=9 with optional $n_z$ and distribution on two processors operating in parallel.

An example with two processors and in turn the 7-point stencil with the lattice shown in FIG. 2 and with $n_x=10$ and $n_y=11$ and istr=9 with optional $n_z$ is shown in FIG. 14.

Firstly the first processor, independently of the second processor, calculates the first approximate solutions for the color subsets C(1) and C(2). Simultaneously, the second processor which is independent of the first processor calculates the first approximate solutions for the color subsets C(5) and C(6). For this purpose, the values needed in themselves for the lattice points of the subsets C(8) C(9) or C(3), C(4) are respectively set to zero.

After calculation of the subsets C(2) or C(6), synchronization takes place. That is to say, calculation of the next subsets C(3) or C(7) is only begun when both processors have terminated the respective calculations of the preceding subsets. This is necessary, since the values of the subsets C(3) or C(7) enter into the calculation of the values for C(5) or C(1). An alteration in the values for C(3), while calculation for C(5) is not yet terminated, would lead to an uncertainty in the calculation, since the values from C(3) are required for calculation of C(5), so that the result for C(5) would then be dependent on more or less random operational conditions of the respective processors.

After synchronization, the subsets C(3) and C(4) are then calculated by the first processor, and subsets C(7) and C(8) and C(9) by the other processor. Then the processors are again synchronized, and the method begins with a new pass and calculation of the subsets C(1) or C(5), the first approximate solutions for the subsets C(8), C(9) or C(3), C(4), which have been calculated in the preceding pass being used. This loop is repeated until the condition id=nd is reached in algorithm (2), i.e. until it can be assumed that the approximate solution is sufficiently good. Normally, two passes (nd−2) are sufficient for a satisfactory approximate solution.

An example of pseudo code of a preferred algorithm (5) for this processing on a parallel vector computer is shown in FIGS. 15 and 16.

Figure 17:
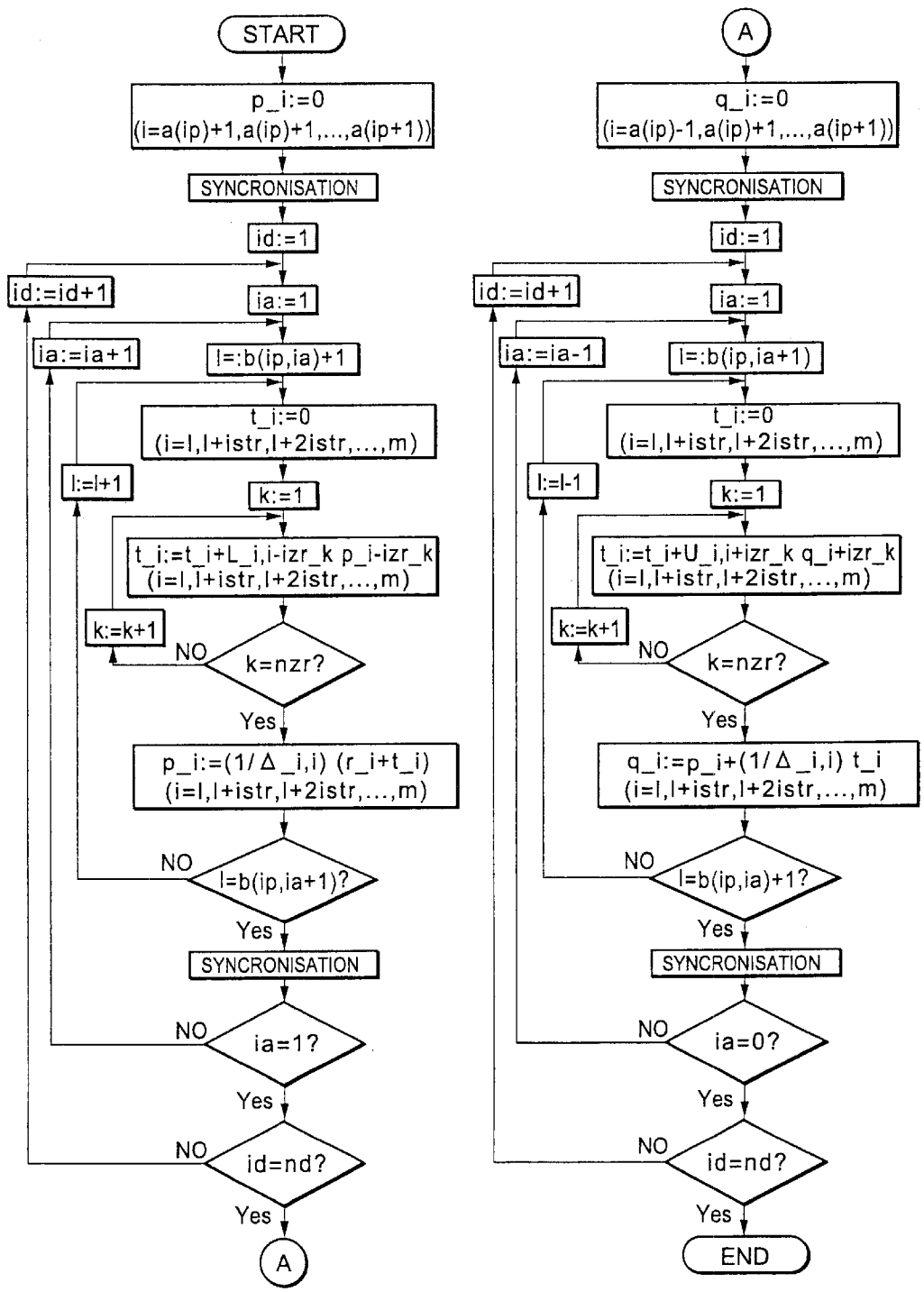
FIG. 17 shows a flowchart for further explanation of the algorithm (5)

Also, a flowchart corresponding to this algorithm is shown in FIG. 17 for further explanation.

If more than two processors are provided, the loops run via ia from 0 to int ((istr/np))−1, np being the number of processors.

The person skilled in the art will easily recognize that the method according to the invention adapts to special actualities of a respective vector computer, such as the queue length and the number of memory banks, so that it operates more rapidly than known methods. Also, without further outlay, further dependencies than the known 5-point stencil or 7-point stencil can be taken into account.

Figure 18:
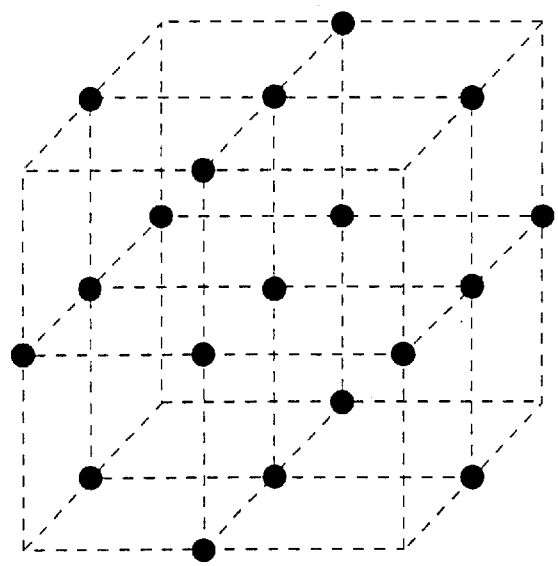
FIG. 18 shows an example of a 19-point stencil.
Figure 19:
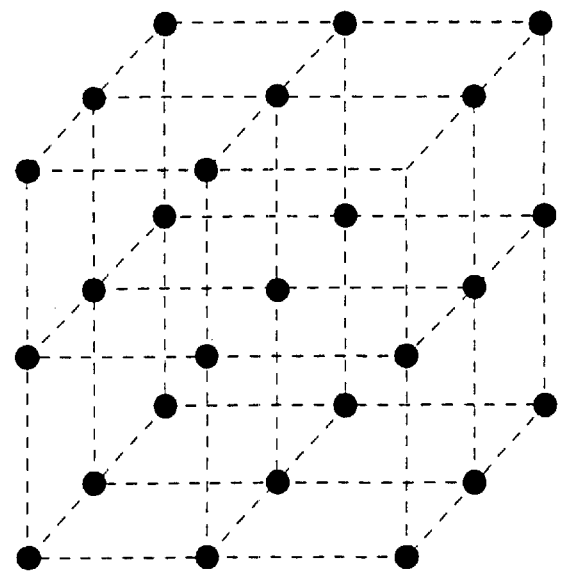
FIG. 19 shows an example of a 27-point stencil.

For example, the 19 and 27-point stencils shown in FIGS. 18 and 19 can be calculated.

Furthermore, the method according to the invention is outstandingly suitable for parallel processing on a plurality of independent processors, particularly also in a computer system with distributed memory, each processor having allocated thereto its own memory area, so that access conflicts are avoided.

What is claimed is:

1. Method of calculating, by the use of a vector computer, an approximate solution of an equation which is determined by at least one lower matrix and one upper matrix in accordance with multi-color technique including forward and reverse substitution operation, said vector computer comprising at least one vector processor and a plurality of memory banks, the method comprising the steps of:

preparing a constant stride depicted by istr for accessing memory in constant stride to operate the substitutions; and calculating the istr based on the following steps prior to the substitutions, a) selecting a predetermined function mod (izr, istr) $\neq 0$ for each izr, where each izr is a number which represents a distance between the sequence of diagonal elements of the lower or upper matrix and one of secondary diagonal sequences each of which includes elements remote from and parallel to the sequence of diagonal elements and which includes at least one element different from zero in the sequence;

b) calculating the greatest common divisor (GCD) of istr and the number of memory banks and selecting the istr which the result of the GCD becomes equal to 1; and c) determining the smallest one of istr among possible candidate numbers.

2. The method of claim 1, wherein the equation is defined by $(\Delta-L) \Delta^{31\ 1} (\Delta-U) q=r$, where $\Delta$ is a m×m diagonal matrix, L is a lower m×m triangular matrix, U is an upper m×m triangular matrix, q is a vector of dimension m, and r is a vector of the dimension m.

3. The method of claim 1, wherein the steps of calculating the istr further comprises d) determining, for each izr, x which is at least twice as great as the number of the vector processors incorporated in parallel, where, x=min{int(istr/mod(izr, istr)).

4. The method of claim 1, wherein the step c) is determined via a fuzzy logic.

5. The method of claim 3, wherein the step d) is determined via a fuzzy logic.

6. A computer readable medium which stores a program operable for calculating, by the use of a vector computer, an approximate solution of an equation which is determined by at least one lower matrix and one upper matrix in accordance with multi-color technique including forward and reverse substitution operation, said vector computer comprising at least one vector processor and a plurality of memory banks, the method comprising the steps of:

preparing a constant stride depicted by istr for accessing memory in constant stride to operate the substitutions; and calculating the istr based on the following steps prior to the substitutions, a) selecting a predetermined function mod (izr, istr) $\neq 0$ for each izr, where each izr is a number which represents a distance between the sequence of diagonal elements of the lower or upper matrix and one of secondary diagonal sequences each of which includes elements remote from and parallel to the sequence of diagonal elements and which includes at least one element different from zero in the sequence;

b) calculating the greatest common divisor (GCD) of istr and the number of memory banks and selecting the istr which the result of the GCD becomes equal to 1; and c) determining the smallest one of istr among possible candidate numbers.

* * * * *